April 21, 1942.    H. C. SNOW    2,280,641
TRANSMISSION SHIFTING MECHANISM
Filed Dec. 5, 1938    2 Sheets-Sheet 1
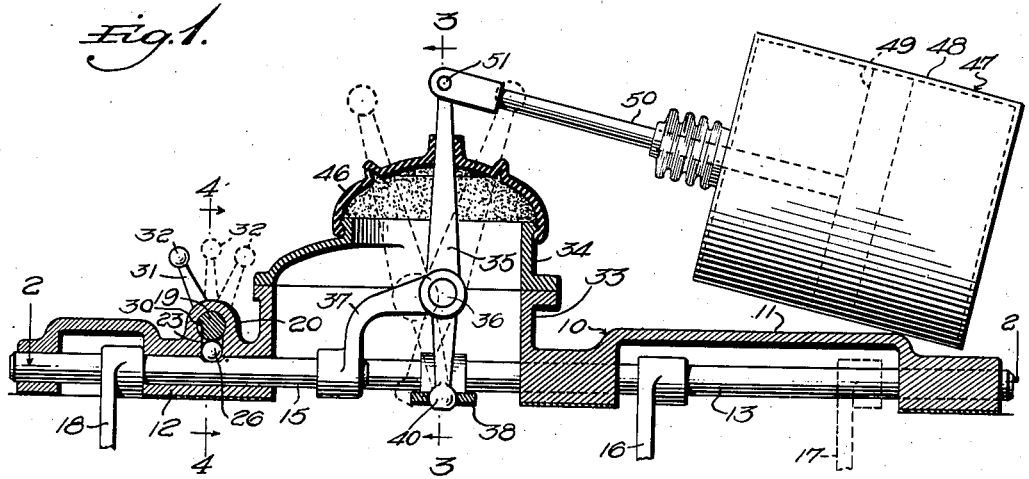
Fig. 1.
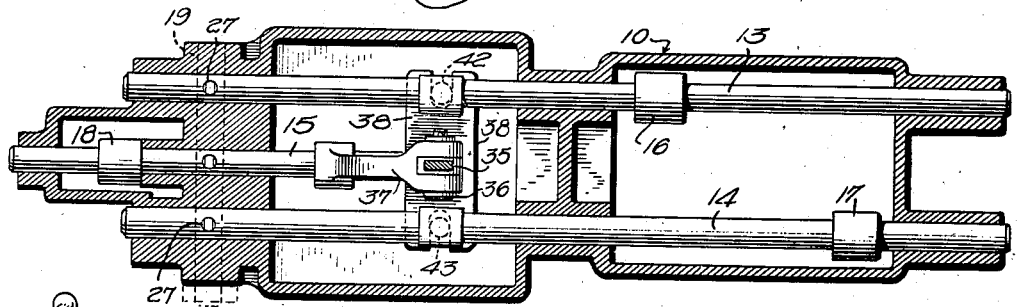
Fig. 2.
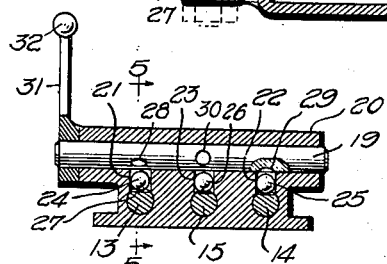
Fig. 4.
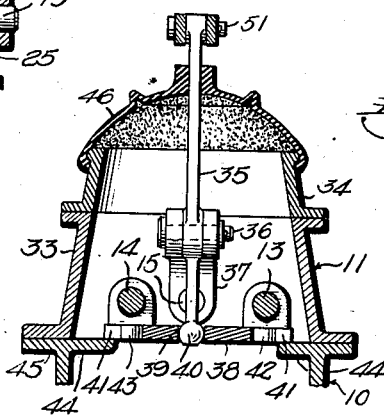
Fig. 3.
Fig. 5.
Inventor
H. C. SNOW April 21, 1942.                    H. C. SNOW                    2,280,641
                        TRANSMISSION SHIFTING MECHANISM
                            Filed Dec. 5, 1938              2 Sheets-Sheet 2
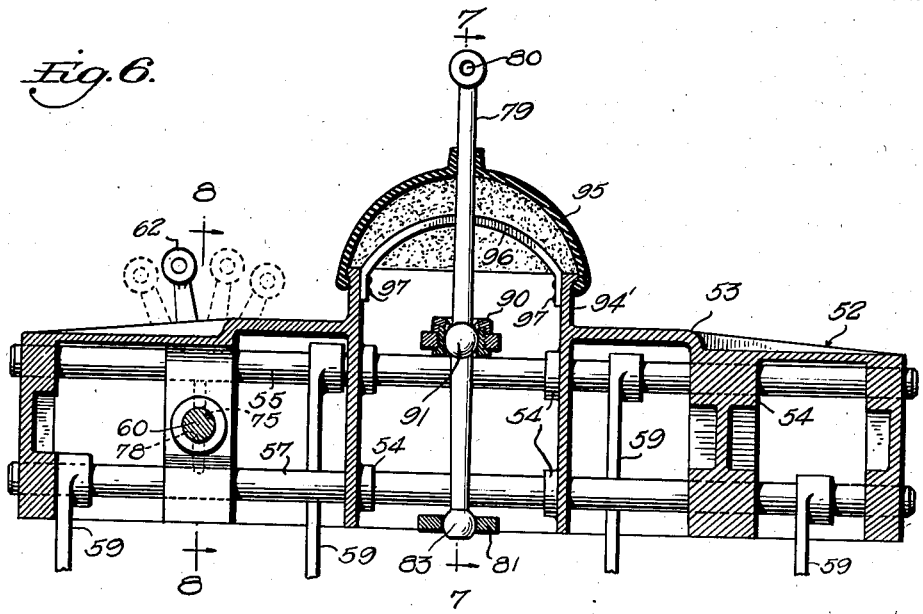
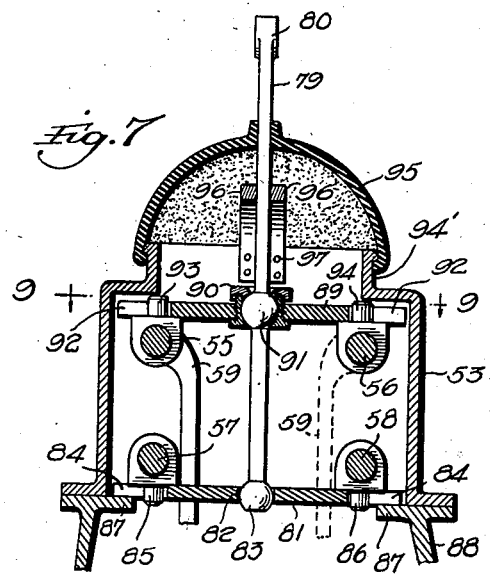
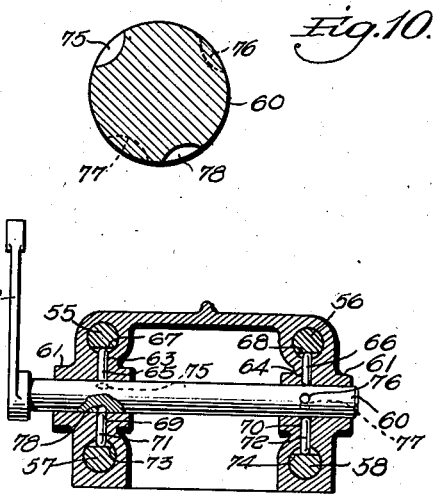
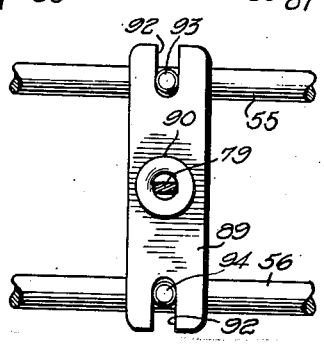
Inventor
H. C. Snow Patented Apr. 21, 1942

2,280,641

UNITED STATES PATENT OFFICE 2,280,641

TRANSMISSION SHIFTING MECHANISM

Herbert C. Snow, Auburn, Ind., assignor to Automatic Shifters, Inc., Richmond, Va., a corporation of Virginia Application December 5, 1938, Serial No. 244,089

19 Claims. (Cl. 74—477)

This invention relates to transmission shifting mechanisms, and more particularly to a mechanism for shifting the gears of the transmissions employed with heavy motor vehicles such as trucks and busses.

It is the common practice in passenger vehicle transmissions to provide two longitudinally shiftable members for effecting changes in the direction of movement of the vehicle and in the transmission ratios. The selection and actuation of the shiftable members is controlled in conventional shifting mechanisms by a manually operable handle which is movable transversely for selecting either shiftable member for operation and longitudinally for moving the selected shiftable member.

A number of power operated mechanisms for controlling motor vehicle transmissions have been developed and such mechanisms usually have been adapted to conventional transmissions. Accordingly, it has been the common practice to provide power means to effect lateral movement of some element with respect to the transmission to select either shift rail thereof for actuation, different power means being employed for actuating the selected shift rail. The use of a power device for selecting either shift rail for actuation has been necessary because of the substantial friction which must be overcome in performing the selecting operation.

In the copending application of John A. Lawler, Serial No. 161,318, filed August 27, 1937, there is described and claimed a transmission wherein selection of the shift rails may be performed against negligible resistance, thus rendering it practicable to eliminate the power means usually employed for selecting either shift rail for actuation. Accordingly, such construction requires the use of only a single power device, and such device is employed for actuating the selected shift rail, the selecting operation being capable of manual performance. The prior construction referred to is particularly adapted for use with transmissions of the type employed in passenger motor cars wherein two shift rails are employed for providing one speed in reverse and three forward speeds.

It is desirable to provide a practicable transmission shifting mechanism for use in connection with heavier vehicles such as trucks and busses wherein three or more shift rails are employed and it is an important object of the present invention to provide all of the advantages of the structure of the copending application referred to in a shifting mechanism for heavy vehicles wherein the operation of selecting the shift rails for operation may be performed manually substantially regardless of the number of shift rails employed.

More specifically, it is an important object of the present invention to provide a shifting mechanism for a transmission having three or more shift rails and wherein either of such shift rails may be manually selected for operation and wherein any selected shift rail is capable of actuation by a single power device.

A further object is to provide a single member capable of having its position altered to select either of three or more shift rails for operation, and to provide a single power source for operating the selected shift rail.

A further object is to provide a shifting mechanism for a transmission having three or more shift rails wherein either shift rail may be manually selected for operation and wherein a single lever is capable of actuating whichever shift rail is selected for operation.

A further object is to provide a single element connected for manual operation whereby its position may be altered to select either three or more shift rails for actuation, and to provide shifting means for actuating the selected shift rail, the selecting and shifting means being correlated whereby operation of the shifting means will be determined by the selecting means to effect actuation of the selected shift rail.

A further object is to provide an apparatus of the character just referred to wherein the shifting means comprises a single lever which is adapted to pivot about different points as predetermined by the selecting means to transmit movement to the selected shift rail.

A further object is to provide a shift lever engageable with a whiffletree lever connected to both of a pair of shift rails and wherein the lever is pivoted with respect to a third shift rail whereby the latter, when locked, will cause the shift lever to transmit movement to whichever of the pair of shift rails is unlocked, and wherein the locking of both rails of such pair will cause the shift lever to pivot with respect to the whiffletree lever and thus transmit movement to the third shift rail.

A further object is to provide a single shift lever for actuating either shift rail of a plurality of pairs of shift rails depending upon the selection of such shift rails for operation, the shift lever being arranged to pivot with respect to either pair of shift rails both of which are locked against movement by the selecting means.

A further object is to provide a shift lever engageable with a pair of whiffletree levers each of which has connection with a pair of shift rails, and to provide means for locking both rails of one pair and one rail of the other pair whereby the shift lever will pivot with respect to the whiffletree lever associated with the locked pair of shift rails whereby the other whiffletree lever will be moved to actuate the unlocked shift rail of its associated pair.

Other objects and advantages of the invention will become apparent during the course of the following description.

In the drawings I have shown two embodiments of the invention. In this showing—

Figure 1 is a central vertical longitudinal sectional view through a portion of a 3-rail transmission showing the invention applied, Figure 2 is a section taken substantially on line 2—2 of Figure 1, parts being shown in elevation, Figure 3 is a transverse vertical sectional view on line 3—3 of Figure 1, Figure 4 is a similar view on line 4—4 of Figure 1, Figure 5 is an enlarged sectional view taken transversely through the selecting shaft substantially on line 5—5 of Figure 4, Figure 6 is a section similar to Figure 1 showing a modified form of the invention, Figure 7 is a transverse vertical sectional view on line 7—7 of Figure 6, Figure 8 is a similar view on line 8—8 of Figure 6, Figure 9 is a horizontal sectional view taken substantially on line 9—9 of Figure 7, the transmission casing being omitted, and Figure 10 is an enlarged transverse sectional view through the selecting shaft taken on line 10—10 of Figure 8.

In Figures 1 to 5 inclusive the invention has been shown as applied to a 3-rail transmission of the type which is now in common use in trucks and busses. The numeral 10 designates the transmission as a whole, the gears of which have been omitted. The transmission comprises a cover plate 11 having a plurality of bearings 12 arranged to slidably support a plurality of shift rails 13, 14 and 15, these rails being respectively provided with depending forks 16, 17 and 18 through which movement of the shift rails is imparted to the elements of the gear set to be shifted, as will be obvious. The two shift rails 13 and 14 are adapted to partake of the proper sliding movements to provide reverse gear and three forward speeds, and the shift rail 15 may be movable to provide a fourth forward speed. It will become apparent, however, that the present invention is not limited in its use to a 3-rail transmission of any particular type. For example, according to the design of the transmission, the shift rail 13 may be moved to provide low and reverse gears, or these gears may be provided by actuating the shift rail 14, etc.

The present invention contemplates the transmission of force to all of the shift rails to tend to move them, together with means for locking all of the shift rails except one, whereby such single shift rail may be moved upon the application of the shifting force. The shift rail selecting mechanism, that is, the mechanism for determining which shift rail shall be released to be actuated, comprises a transverse rock shaft 19 mounted in a bearing 20 which may be formed integral with the cover plate 11 as shown in Figure 1. In the bottom of the bearing 20 the cover plate is provided with openings 21, 22 and 23 lying in the vertical plane of the axis of the selecting shaft 19 and corresponding in position to the respective shift rails 13, 14 and 15 (Figure 4). Locking elements 24, 25 and 26 are arranged in the respective openings 21, 22 and 23, and the locking elements may be in the form of balls as shown in Figure 4.

Each of the shift rails is provided in its upper face with a notch 27 adapted to receive the adjacent locking element, and when the transmission is in neutral position, the notches 27 lie in the vertical plane of the axis of the shaft 19 and accordingly each is arranged directly beneath its locking element under such conditions. The shaft 19 is provided with circumferentially spaced notches 28, 29 and 30 which are adapted to selectively receive the locking elements 24, 25 and 26 depending upon the turned position of the shaft 19. An operating crank 31 is carried by one end of the shaft 19 and may be provided at its upper end with a ball 32 receivable in a suitable socket carried by operating connections (not shown) through which the shaft 19 is adapted to be rocked.

The crank 31 is adapted to be selectively moved between the three positions shown in Figure 1 and in each such position one of the notches 28, 29 or 30 will be in vertical alignment with its locking element, the other two notches of the shaft being turned out of alignment with their locking elements whereby cylindrical portions of the shaft 19 will engage the latter. Accordingly, two of the locking elements at all times will be prevented from moving upwardly out of the notches of the shift rails. Accordingly, two shift rails will be locked in any position of the shaft 19 while one shift rail will be released whereby the application of force to the latter shift rail will move it into a gear position, as will be described later.

Referring to Figure 1 it will be noted that the cover plate 11 is provided with an integral tower portion 33 above which is secured an extension 34, and within the tower there is arranged a shift lever 35. The lever 35 is pivotally supported intermediate its ends on a pin 36 carried by a bracket arm 37 secured to the adjacent end of the shift rail 15, this shift rail being relatively short and terminating to one side of the lever 35 as shown. It will become apparent that the shift rail 15 is movable only to the left of its neutral position shown in Figure 1, the hub of the fork 18 engaging the adjacent bearing 12 to prevent movement of the shift rail 15 in the other direction.

A whiffletree lever 38 extends transversely of and is arranged below the shift rails 13 and 14 and is provided intermediate its ends with an opening 39 receiving a ball 40 carried by the lower end of the shift lever 35. The ends of the whiffletree lever are notched as at 41 to receive pins 42 and 43 carried by and depending from the respective shift rails 13 and 14. The whiffletree lever 38 may be supported in the proper plane of movement in any suitable manner and in Figure 3 the lever 38 has been shown as being slidably supported on flanges 44 forming a part of the transmission housing 45. The lever 35 is shown in a position slightly closer to the shift rail 14 than to the rail 13. Under such conditions a given swinging movement of the shift lever with the rail 14 locked and the rail 13 unlocked will move the latter to a greater extent than the same movement of the shift lever 35 would move the rail 14 if the latter were unlocked with the rail 13 locked. In the arrangement shown, therefore, the shift rail 13 is preferably the low and reverse gear shift rail of a transmission since such rail is required to move a greater distance from neutral position into each of its gear positions since an actual meshing of gears is required whereas the other shift rail of the pair, in present day transmissions, is operable for providing gear ratios through the medium of synchronizing clutches.

A rubber or similar boot 46 (Figures 1 and 3) is carried by the top of the transmission tower and the upper end of the lever projects through the center of such boot. It will be apparent that the boot excludes the entrance of dirt or other foreign material into the transmission while permitting movement of the shift lever to provide the different gear ratios.

As previously stated the present apparatus is particularly intended for use in a power shifting mechanism and accordingly the upper end of the lever 35 is preferably connected for operation by a suitable motor. In Figure 1 a fluid pressure motor 47 is indicated as being arranged above the transmission, although it will be apparent that this arrangement is shown solely for the purpose of illustration. The motor 47 comprises a cylinder 48 having a piston 49 therein reciprocable under the influence of differential pressures on opposite sides thereof as controlled by a suitable valve mechanism (not shown). The piston is provided with a piston rod 50 connected as at 51 to the upper end of the lever 35.

The invention is also applicable to transmissions employing more than three shift rails, and in Figures 6 to 10 inclusive the mechanism has been shown applied to a 4-rail transmission. In such modified form of the invention the numeral 52 designates the transmission as a whole comprising a cover 53 having suitable bearings 54 formed in different parts thereof for slidably supporting shift rails 55, 56, 57 and 58. As shown in Figures 7 and 8 the shift rails 55 and 56 may lie in a common upper horizontal plane while the shift rails 57 and 58 lie in a common lower horizontal plane. Each of these shift rails is movable to provide the desired gear ratios as will be apparent, movement being transmitted to the usual transmission parts through forks 59.

A transverse selecting shaft 60 is arranged horizontally between the planes of the upper and lower pairs of shift rails as shown in Figure 8 and is supported in bearings 61 forming a part of the cover 53. An operating crank 62 is connected to one end of the shaft 60 and it will become apparent that this shaft may be turned by the application of manual force to the crank 62 to select either of the shift rails for operation. The bearings 61 are provided with upper openings 63 and 64 in which are arranged locking elements 65 and 66 shown in the present instance as being in the form of pins. The upper ends of these pins are respectively engageable in notches 67 and 68 formed in the respective shift rails 55 and 56.

Similarly, the bearings 61 are provided beneath the shaft 60 with openings 69 and 70 in which are arranged locking pins 71 and 72 respectively engageable in notches 73 and 74 formed in the shift rails 57 and 58. For the purpose of controlling the respective locking pins, the shaft 60, as clearly shown in Figure 10, is provided with openings 75, 76, 77 and 78 adapted to receive the adjacent ends of the respective pins 65, 66, 71 and 72. It will be apparent that the notches 75 and 78 are arranged in a plane passing through the pins 65 and 71 perpendicular to the axis of the shaft 60 while notches 76 and 77 are arranged in a plane passing through the pins 66 and 72 perpendicular to the axis of the shaft 60. The notches of the shaft 60 are circumferentially spaced from each other and so arranged that only one at a time can come into registration with its respective locking pin. Therefore, it will be apparent that in any position of the shaft 60 only one locking pin will be free for disengagement with the notch of its associated shift rail, all of the remaining locking pins being engaged by cylindrical portions of the shaft 60 to be maintained in engagement with the notches of their respective shift rails.

Means are provided for simultaneously applying a force to all of the shift rails to tend to move them and to thus effect movement of the selected unlocked shift rail. A single shift lever 79 is employed for effecting movement of either of the shift rails and this lever is adapted for connection at its upper end as at 80 to a suitable source of power such as the motor shown in Figure 1. A lower whiffletree 81 is provided intermediate its ends with an opening 82 receiving a ball 83 carried by the lower end of the shift lever 79. The lever 81 is notched at its ends as at 84 to receive depending pins 85 and 86 carried by the respective shift rails 57 and 58. The whiffletree lever 81 may be supported in its plane of movement in any suitable manner and has been shown as being slidable upon flanges 87 formed integral with the transmission housing 88. Under certain conditions to be described the shift lever transmits movement to the lever 81 through the ball 83, while under other conditions, the shift lever pivots on the ball 83.

An upper whiffletree lever 89 is provided with any suitable form of socket 90 to receive a ball 91 formed on the shift lever 79. The lever 89 is notched at its ends as at 92 to receive upstanding pins 93 and 94 carried by the respective shift rails 55 and 56. When the shift lever pivots on the ball 83 movement will be transmitted to the whiffletree lever 89 to move one of the shift rails 55 or 56 as will become apparent. On the other hand, the shift lever also pivots on the ball 91, under conditions to be described, in which case the ball 83 actuates the lever 81 to transmit movement to one of the shift rails 57 or 58.

The cover 53 is provided with a tower 94' (Figures 6 and 7) which carries a rubber or similar boot 95 through the center of which passes the shift lever 79. It will be apparent that the boot 95 performs the same function as the boot 46 previously described in that it seals the transmission from the entrance of dirt or other foreign material while permitting the swinging of the shift lever 79. A pair of guides 96 are arranged above the shift rail 89 and are preferably curved from end to end as shown in Figure 6. The ends of the guides are secured as at 97 within the tower 94'. These guides are not essential to the operation of the apparatus but are preferably employed to predetermine the path of movement of the shift lever 79 in a vertical plane parallel to the axes of the shift rails.

The operation of the form of the invention shown in Figures 1 to 5 inclusive is as follows:

As previously stated, either of the shift rails 13, 14 or 15 may be selected for operation by the shift lever 35 while locking the other two shift rails, and this is accomplished by turning the shaft 19 to the proper position. Such turning of the shaft is accomplished by applying a force to the crank arm 31 through a suitable mechanism connected to the ball 32. The present invention is not concerned with the particular means employed for operating the crank 32, but such means preferably is manually operated to eliminate the necessity for the use of a power device for performing the selected operation, and the means employed may be provided, in any desired manner, with means for indicating to the operator the three positions of the shaft 10. In this connection it will be noted that substantially the only resistance offered to the selecting operation is a slight friction which occurs incident to the rocking of the shaft 19. The absence of any sliding parts, spring detents, etc. renders it practicable to manually perform the selecting operation.

Assuming that the operator desires to select the shift rail 13 for operation, which shift rail may be the low and reverse gear rail, it merely is necessary for the operator to turn the shaft 19 to a position in which the notch 28 is arranged in alignment with the locking ball 24. Obviously this operation can be performed only when the three shift rails are in neutral position since if either shift rail is out of neutral position its associated locking ball necessarily will be in engagement with the corresponding notch of the shaft 19, thus preventing turning movement thereof. Assuming that the shaft 19 is turned to the position referred to, the ball 24 will be free to move upwardly upon the application of a longitudinal shifting force to the rail 13. The rails 14 and 15, however, will be locked against movement since their respective locking balls 25 and 26 will be in engagement with circumferential portions of the shaft 19 and accordingly cannot move upwardly out of their respective notches in the shift rails 14 and 15.

Having thus selected the shift rail 13 for operation a force may be applied to the shift lever 35 as by energizing the motor 47 to move the piston in either direction, depending upon whether the shift rail 13 is to be moved to the reverse or low gear position. When a force is applied to the lever such lever will pivot at the point 36 inasmuch as the rail 15 is fixed against longitudinal movement by its locking means. Under such conditions the lower end of the shift lever 35 will transmit a horizontal force to the whiffletree lever 38 transversely thereof. Since the shift rail 14 will be locked under the conditions being considered it follows that the whiffletree lever will pivot on the pin 43 (Figure 3) and the opposite end of the lever 38 will transmit movement to the unlocked shift rail 13 in the desired direction.

In a similar manner, assuming that the selecting shaft 19 is in neutral position, the shift rail 14 may be selected for operation by turning the shaft 19 to bring the notch 29 into registration with the opening 22 (Figure 4). Under such conditions the locking ball 25 is free to move upwardly upon the application of longitudinal force to the shift rail 14, but the rails 13 and 15 will be fixed against movement since their locking balls 24 and 26 will be held in their lower positions by engagement with circumferential portions of the shaft 19. If a force is now transmitted to the shift lever 35 the same operation as previously described will take place except that the whiffletree lever 38 will pivot on the pin 42, the shift rail 13 being locked against movement, and the opposite end of the lever will actuate the pin 43 to shift the rail 14 in the proper direction, depending upon the direction of swinging movement of the shift lever.

If it is desired to shift the rail 15, for example to provide the fourth forward speed, the shaft 19 will be turned to move the notch 30 (Figure 4) into registration with the opening 23 whereby the ball 26 will be free to move upwardly when a force is applied to the shift rail 15. The shift rails 13 and 14 will be locked against movement since their locking balls 24 and 25 will be held in the notches 27 of the rails 13 and 14 by engagement with cylindrical portions of the shaft 19. The shift rail 15 is free to move only to the left as viewed in Figure 1, as previously stated, and when it is desired to shift the rail 15 after it has been selected for operation, a force will be applied to the upper end of the shift lever 35 to move it toward the left. Since both shift rails 13 and 14 will be locked against movement the whiffletree lever 38 will be anchored against movement and the shift lever 35 will pivot on the ball 40 (Figure 1) transmitting force through the bracket arm 37 to the shift rail 15 to move it to the left of its neutral position shown in Figure 1 and thus provide the desired gear ratio.

It will be apparent that the apparatus described is extremely simple in construction and operation and greatly facilitates the shifting of a 3-rail transmission. It merely is necessary to turn the single shaft 19 to either of a plurality of selected positions and then effect movement of the single shift lever 35, whereupon the selected shift rail will be moved to provide reverse gear or either of four forward speeds.

In the form of the invention shown in Figures 6 to 10 inclusive reverse gear and as many as seven forward gears may be provided by the same simple mode of operation. The notches 75, 76, 77 and 78 are so circumferentially spaced with respect to each other that only one of the locking pins can be released from its associated shift rail at a time. All of the remaining shift rails will be locked against movement since the remaining locking pins will be held in locking position by engagement with cylindrical portions of the shaft 60. For example, if it is desired to shift the rail 57 the shaft 60 will be turned slightly in a clockwise direction from the position shown in Figure 10 to arrange the notch 78 in alignment with the pin 71 whereupon the latter is free to move upwardly out of engagement with its notch 73. All of the remaining notches of the shaft 60 will be turned out of alignment with their locking pins and the latter will engage cylindrical portions of the shaft 60.

Under such conditions it will be apparent that the shift rail 57 is the only rail released for movement and it may be moved upon the transmission of a force to the upper end of the shift lever 79, this lever being turned in either direfition depending upon the gear to be rendered effective by the rail 57. Under the conditions referred to both of the upper shift rails 55 and 56 will be locked against movement and accordingly the upper whiffletree lever 89 will be immovable. Accordingly, the lever 79 will turn about the ball 91 to transmit movement to the whiffletree lever 81 and since the shift rail 58 is fixed against movement, the lever 81 will transmit movement to the shift rail 57 to provide the desired gear ratio.

Similarly, the shift rail 58 may be selected for operation by turning the shaft 76 in a counter-clockwise direction from the position shown in Figure 10 to arrange the notch 77 in alignment with the pin 72 to permit this pin to move upwardly out of the notch 74. Upon actuation of the lever 79 the operation previously described will take place except that the whiffletree lever 81 will pivot on the pin 85 and the opposite end of the lever will shift the rail 58 into the desired gear position.

The rail 55 is selected for movement by turning the shaft 60 in a clockwise direction from the position shown in Figure 10 to arrange the notch 75 in alignment with the pin 65 whereby the upper end of the latter is movable downwardly out of engagement with the notch 67. Under such conditions the rails 56, 57 and 58 will be fixed against movement since their respective locking pins will engage cylindrical portions of the shaft 60. If a force is now transmitted to the lever 79 this lever will pivot on the ball 83, the whiffletree lever being immovable since both of the shift rails 57 and 58 will be locked. Therefore the ball 91 will move the whiffletree lever 89 horizontally and since the shift rail 56 will be locked the lever 89 will pivot on the pin 94 and the other end of the lever 89 will move the pin 93 to shift the rail 55.

It will be obvious that similar operations may be performed to shift the rail 56. The shaft 60 will be turned counter-clockwise from the position shown in Figure 10 to align the notch 76 with the pin 66 whereby the latter may move downwardly out of engagement with the notch 68. All of the remaining shift rails obviously will be locked against movement since their locking pins will engage cylindrical portions of the shaft 60. When a force is applied to the upper end of the lever 79, therefore, this lever will again pivot on the ball 83 and since the rail 55 will be locked, the whiffletree lever 89 will turn about the pin 93 and the other end of the lever will move the pin 94 and thus shift the rail 56.

From the foregoing it will be apparent that either form of the invention lends itself readily to use with gear shifting mechanisms for trucks and busses having three or more shift rails and it is wholly unnecessary to use a power device to effect the selection of either shift rail, the minimum resistance offered to the turning of the selecting shaft being so slight as to permit such operation to be manually performed. It also will be apparent that in each form of the invention a single shift lever operable by a single motor transmits movement to either of three or more shift rails. The pivot point and the functioning of the shift lever in each case is predetermined in accordance with the selected shift rail and the shifting of the pivot points permits the single shift lever to be employed for shifting three or more shift rails while the upper end of the shift lever moves in the same path regardless of the shift rail selected for operation.

In the form of the invention shown in Figures 6 to 10 inclusive one reverse speed and as many as seven forward speeds may be provided with the single shift lever referred to and the nature of the apparatus is such as to permit the shifting operation to be performed with a single motor. The guide members 96 are not essential to the apparatus but are employed merely to steady the operation of the shift lever and to more accurately predetermine its path as will be apparent.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In combination with a transmission having at least three members shiftable for providing different gear ratios, a pair of motion transmitting connections one connected to a pair of said shiftable members and the other connected to at least one other shiftable member, said other shiftable member being arranged in a plane different from that of said pair of shiftable members, a lever perpendicular to the plane of said pair of shiftable members for simultaneously transmitting an actuating force to said connections, each shiftable member being provided with a notch, a plurality of locking elements each engageable in one of said notches, and control means for said locking elements operable independently of said first named means selectively movable to a plurality of positions and operative in each position for holding all but one of said locking elements in its associated notch and for releasing the remaining locking element whereby the shiftable member associated with such remaining locking element will be moved upon the application of such force.

2. In combination with a transmission having two pairs of members shiftable for providing different gear ratios, a pair of motion transmitting connections arranged in spaced parallel planes and each connected to a pair of said shiftable members, a lever movable in a plane perpendicular to said parallel planes for simultaneously transmitting an actuating force to said connections, and selecting means for predetermining which shiftable member will be moved upon the application of such force.

3. In combination with a transmission having two pairs of members shiftable for providing different gear ratios, a pair of motion transmitting connections arranged in spaced parallel planes and each connected to a pair of said shiftable members, a lever movable in a plane perpendicular to said parallel planes for simultaneously transmitting an actuating force to said connections, and selecting means connected to lock all but one of said shiftable members against movement whereby the application of such force will actuate such one shiftable member.

4. In combination with a transmission having two pairs of members shiftable for providing different gear ratios, a pair of motion transmitting connections arranged in spaced parallel planes and each connected to a pair of said shiftable members, a lever movable in a plane perpendicular to said parallel planes for simultaneously transmitting an actuating force to said connections, and a selecting mechanism comprising a locking element for each of said shiftable members, and means selectively movable to a plurality of positions and operative in each position for locking all but one of said locking elements and releasing the remaining element from its associated shiftable member whereby the application of said actuating force will move the latter shiftable member.

5. In combination with a transmission having two pairs of members shiftable for providing different gear ratios, a pair of motion transmitting connections arranged in spaced parallel planes and each connected to a pair of said shiftable members, a lever movable in a plane perpendicular to said parallel planes for simultaneously transmitting an actuating force to said connections, each shiftable member being provided with a notch, a plurality of locking elements each engageable in one of said notches, and control means for said locking elements selectively movable to a plurality of positions and operative in each position for holding all but one of said locking elements in its associated notch and for releasing the remaining locking element whereby the shiftable member associated with such remaining locking element will be moved upon the application of such force.

6. In combination with a transmission having at least three members shiftable for providing different gear ratios, two of said members being arranged in a plane spaced from at least one other member, a shifting mechanism comprising a shift lever movable in a plane perpendicular to said first named plane and connected to simultaneously apply a shifting force to said members, and selecting means connected to determine the position of the pivot point of said lever whereby, upon actuation of said lever, a point thereon remote from such pivot point will transmit a force to at least one of said shiftable members, said selecting means being also operative for determining which shiftable member will be actuated, said mechanism further comprising a floating lever having slidable pivot connections at its ends with two of said shiftable members and connected intermediate its ends to said shift lever.

7. In combination with a transmission having at least three members shiftable for providing different gear ratios, a pair of motion transmitting means arranged in spaced parallel planes and connected to said shiftable members, a shift lever perpendicular to said planes and having pivotal connection with both motion transmitting means at spaced points, and selecting means connected to lock all but one of said shiftable members whereby said lever will move the motion transmitting means associated with the shift rail which is not locked against movement and will pivot at the other motion transmitting means, one of said motion transmitting means being a floating lever having slidable pivot connections at its ends with a pair of said shiftable members and pivotally connected intermediate its ends to said shift lever.

8. In combination with a transmission having three shiftable members, a floating lever connected adjacent its ends to two of said shiftable members, a shift lever pivotally engaging said floating lever intermediate the ends thereof, means pivotally connecting said shift lever to the remaining shiftable member at a point spaced from said floating lever, and selecting means for predetermining which of said shiftable members will be actuated upon the application of a force to said shift lever.

9. In combination with a transmission having three shiftable members, a floating lever connected adjacent its ends to two of said shiftable members, a shift lever pivotally engaging said floating lever intermediate the ends thereof, means pivotally connecting said shift lever to the remaining shiftable member at a point spaced from said floating lever, and selecting means connected to lock any two of said shiftable members against movement whereby the other shiftable member will be actuated upon the application of a force to said shift lever.

10. In combination with a transmission having three shiftable members, a floating lever connected adjacent its ends to two of said shiftable members, a shift lever pivotally engaging said floating lever intermediate the ends thereof, means pivotally connecting said shift lever to the remaining shiftable member at a point spaced from said floating lever, a rock shaft mounted to turn to either of three operative positions, and means operative in each position of said shaft for locking two of said shiftable members against movement whereby the other shiftable member will be actuated upon the application of a force to said shift lever.

11. In combination with a transmission having three parallel laterally spaced shiftable members, a floating lever connected at its ends to the two outer shiftable members, a shift lever pivotally connected to said floating lever intermediate the ends of the latter, means pivotally connecting said lever to the intermediate shiftable member at a point spaced from the plane of said outer shiftable members, and selecting means for locking any two of said shiftable members whereby the remaining shiftable member will be actuated upon the application of a force to said shift lever.

12. In combination with a transmission having three parallel laterally spaced shiftable members, a floating lever connected at its ends to the two outer shiftable members, a shift lever pivotally connected to said floating lever intermediate the ends of the latter, means pivotally connecting said lever to the intermediate shiftable member at a point spaced from the plane of said outer shiftable members, a rock shaft movable to three operative positions and operative in each position for locking two of said shiftable members against movement whereby the remaining shiftable member will be actuated upon the application of a force to said shift lever.

13. In combination with a transmission having three parallel laterally spaced shiftable members, a floating lever connected at its ends to the two outer shiftable members, a shift lever pivotally connected to said floating lever intermediate the ends of the latter, means pivotally connecting said lever to the intermediate shiftable member at a point spaced from the plane of said outer shiftable members, a locking element engageable with each shiftable member, and a rock shaft mounted to turn to three positions and operative in each position for locking two of said locking elements in engagement with their associated shiftable members and releasing the other locking element from its associated shiftable member whereby the latter will be actuated upon the application of a force to said shift lever.

14. In combination with a transmission having two pairs of parallel shiftable members arranged in spaced parallel planes, a floating lever connected at its ends to the shiftable members of each pair, a shift lever pivotally connected to each floating lever intermediate the ends thereof, and selecting means connected to render said shift lever operable, upon the application of a force thereto, for moving only one of said shiftable members.

15. In combination with a transmission having two pairs of parallel shiftable members arranged in spaced parallel planes, a floating lever connected at its ends to the shiftable members of each pair, a shift lever pivotally connected to each floating lever intermediate the ends thereof, and selecting means connected to lock any three of said shiftable members whereby the remaining shiftable member will be actuated upon the application of a force to said shift lever.

16. In combination with a transmission having two pairs of parallel shiftable members arranged in spaced parallel planes, a floating lever connected at its ends to the shiftable members of each pair, a shift lever pivotally connected to each floating lever intermediate the ends thereof, and selecting means comprising a control member movable to four positions and operative in each position for locking three of said shiftable members whereby the remaining shiftable member will be actuated upon the application of a force to said shift lever.

17. In combination with a transmission having two pairs of parallel shiftable members arranged in spaced parallel planes, a floating lever connected at its ends to the shiftable members of each pair, a shift lever pivotally connected to each floating lever intermediate the ends thereof, a locking element engageable with each of said shiftable members, and a rock shaft mounted to turn to four positions and operative in each position for locking three of said locking elements in engagement with their respective shiftable members and releasing the other locking element from its associated shiftable member whereby the latter will be actuated upon the application of a force to said shift lever.

18. In combination with a transmission having at least three members shiftable for providing different gear ratios, a shifting mechanism comprising a shift lever connected to simultaneously apply a shifting force to said members, and selecting means connected to determine the position of the pivot point of said lever whereby, upon actuation of said lever, a point thereon remote from such pivot point will transmit a force to at least one of said shiftable members, said selecting means being also operative for determining which shiftable member will be actuated, said mechanism further comprising a floating lever arranged parallel to the plane of two of said shiftable members and having slidable pivot connections at its ends with said two shiftable members, said first named lever being arranged perpendicular to said floating lever and connected at one end to said floating lever intermediate the ends thereof.

19. In combination with a transmission having at least three members shiftable for providing different gear ratios, a pair of motion transmitting means connected to said shiftable members, a shift lever having pivotal connection with both motion transmitting means at spaced points, and selecting means connected to lock all but one of said shiftable members whereby said lever will move the motion transmitting means associated with the shift rail which is not locked against movement and will pivot at the other motion transmitting means, one of said motion transmitting means being a floating lever arranged parallel to the plane of two of said shiftable members and having slidable pivot connections at its ends with said two shiftable members, said first named lever being arranged perpendicular to said floating lever and connected at one end to said floating lever intermediate the ends thereof.

HERBERT C. SNOW.